Patented Aug. 22, 1939

2,170,624

UNITED STATES PATENT OFFICE 2,170,624

PROCESS FOR THE PREPARATION OF PENTAERYTHRITOL

Joseph A. Wyler, Allentown, Pa., assignor to Trojan Powder Company, Allentown, Pa.

No Drawing. Application January 11, 1938, Serial No. 184,457

5 Claims. (Cl. 260—635)

This invention relates to the preparation of pentaerythritol and particularly relates to a process for the preparation of pentaerythritol from methanol-free formaldehyde and acetaldehyde. The principal object of my invention is to provide an improved process for the preparation of pentaerythritol.

It has been known for more than forty years that formaldehyde and acetaldehyde react, in the presence of an alkali to form pentaerythritol, and this knowledge has led to the development of numerous processes for the preparation of this substance. In these various processes, the effect of such factors as temperature at which the reaction is carried out, concentration of reactants, duration of the period of reaction, treatment of the mixture after completion of the condensation, etc. are disclosed.

My invention rests upon my discovery that methyl alcohol acts as a disturbing factor in the reaction of formaldehyde and acetaldehyde to form pentaerythritol, and that in the absence of methyl alcohol the reaction between formaldehyde and acetaldehyde proceeds with greater ease, and goes further toward completion with the production of an increased yield of pentaerythritol based upon the quantities of formaldehyde and acetaldehyde used, than is the case when methyl alcohol is present in the reacting mixture. The significance of this observation will be apparent when it is understood that commercial formaldehyde is always made by the oxidation of methyl alcohol, and that all commercial formaldehyde contains from 3% or 4% up to as much as 15% of methyl alcohol, as an impurity. Up to the time of the present work, it was never known that this small amount of methyl alcohol present as an impurity in formaldehyde was in any way more harmful than the amount of water that is also present in formaldehyde, and which forms merely a harmless diluent. I have discovered, however, that the former conception of the harmless character of methyl alcohol is in error, and by removing methyl alcohol from formaldehyde, (down to a limit of ½ of 1%, below which I have so far not been able to go) I have obtained yields of pentaerythritol distinctly greater than those obtainable by the use of formaldehyde containing methyl alcohol, and very materially greater yields than can be explained by the mere removal of the methyl alcohol when considered as an inactive diluent. In other words, I have discovered that methyl alcohol is actively harmful in the reaction between formaldehyde and acetaldehyde in the formation of pentaerythritol, and that by the elimination of methyl alcohol from the reacting mixture improved yields of pentaerythritol, and improvement in the quality of crude pentaerythritol may be obtained.

When formaldehyde and acetaldehyde react, in alkaline medium, to form pentaerythritol the reaction taking place is usually expressed by the following equation:

$$4CH_2O + CH_3CHO + MOH = C(CH_2OH)_4 + MOOCH$$

where, M is a monovalent metal or one half of a divalent metal.

This simple equation is, however, wholly inadequate in that it does not convey any conception of the types of the reactions which occur during the formation of the pentaerythritol, and consequently, the importance of the presence of catalytic agents and the absence of anti-catalytic agents (which anti-catalytic agents are normally present in the formaldehyde) has never been disclosed.

In the commercial preparation of pentaerythritol, 4 to 5 molecules of $CH_2O$ are used for each molecule of $CH_3CHO$. These are caused to react in an alkaline medium at 20–50° C. and in such a volume of water as to provide a solution to contain less than 20% of aldehydes at the beginning of the reaction. The alkalinity is usually obtained by the use of $Ca(OH)_2$, $Ba(OH)_2$ or NaOH.

After the condensation, the pentaerythritol must be freed from a metal formate and other products. Usually this is done by treating the mixture after the condensation reaction, with sulfuric or oxalic acid, or both, to pecipitate the Ca or Ba ions as sulfate or oxalate. The insoluble Ca or Ba salts are separated by filtration, leaving the pentaerythritol, formic acid and various by-products in solution. This solution is subjected to repeated evaporations and crystallizations in order to separate the pentaerythritol in pure condition.

Among the by-products formed are dipentaerythritol, formose, aldol, possibly arabino-ketose, other compounds possessing primary and/or secondary alcohol groups, a substance of the probable composition of

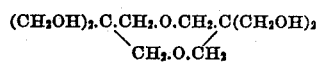

acetals, etc. It is the formation of these which causes the relatively low yields of pentaerythritol—yields of 50–65% of theory—in the present commercial processes.

Now, it is the purpose of my invention to provide a process for the preparation of pentaerythritol in which the yields are above 70% of theory, and usually about 80%.

I accomplish this by using a formaldehyde which is either free from or contains less than 2 parts of $CH_3OH$ per 40 parts of $CH_2O$. I have found that the presence of $CH_3OH$ in the reaction mixture producing pentaerythritol has a directive effect upon the course of the reaction between formaldehyde and acetaldehyde. If a very large amount of $CH_3OH$ be present in the reaction mixture above referred to, the yield of pentaerythritol may be practically nil—a syrupy product is all that forms. Whereas, if methyl alcohol be absent a crystalline product (mainly pentaerythritol) of excellent color results.

My invention does not refer to processes for making a methanol-free formaldehyde, but is related to the use of this type of formaldehyde, regardless of how it is made, in the preparation of pentaerythritol.

As an example of how I may carry out my process, I give the following:

396 parts of 30.34% formaldehyde (by weight), which is free from methanol, are mixed with 83 parts of 52.8% (by weight) of acetaldehyde and 900 parts (by weight) of water. The mixture is stirred in a suitable container and 35 parts of lime (CaO) in the form of a slurry, formed with the aid of 166 parts of water, are slowly added during the course of four to five hours, maintaining the temperature of the reaction mixture at about room temperature until tests indicate the substantial absence of $CH_2O$ and of $CH_3CHO$. A typical end point for the reaction is one indicating 0.09% aldehydes present, as determined with iodine solution.

The reaction being completed, it is necessary to remove the lime in order to obtain the pure pentaerythritol. For this purpose, the mixture is treated with slightly less sulfuric acid than is theoretically equivalent to the lime used. This precipitates the calcium as $CaSO_4$. In order to precipitate all of the lime out of the solution, a small amount of oxalic acid is added in the form of a water solution and the mixture stirred for one hour or more. The latter is then filtered, the filtrate evaporated and the pentaerythritol recovered by crystallization and washing. The total weight of dry crystals obtained is usually about 95–105 parts. The remaining portion (after evaporation) is a syrup.

In the above example I mention certain specific operating conditions but I wish to emphasize that I do not limit myself to these specific details. I may, for instance, use a temperature as low as 10° C. and as high as 50° C.; a concentration of aldehydes as low as 3% and as high as 20%; a proportion of $CH_2O$ to $CH_3CHO$ of from 4:1 to as high as 5:1; a rate of addition of lime corresponding to as low a period of addition as one hour and to as high a period of addition as twenty hours; and I may use, in place of lime, any other suitable base—the essential characteristic of my process being that the reaction mixture is free from methanol or essentially so. The other steps are well known in the art.

It will therefore be clear that my invention comprehends a process for making pentaerythritol which constitutes a distinct improvement over present processes in that it enables one to obtain greater yields of pentaerythritol. I do not limit the scope of my invention, except as indicated in the appended claims.

I claim:

1. The process for the preparation of pentaerythritol comprising the alkaline condensation of acetaldehyde with formaldehyde essentially free from methanol, in aqueous solution.

2. The process for the preparation of pentaerythritol comprising the alkaline condensation of formaldehyde and acetaldehyde in aqueous solution, said solution containing not more than 2 parts by weight of $CH_3OH$ to 40 parts by weight of $CH_2O$.

3. The process for the preparation of pentaerythritol comprising the condensation of formaldehyde and acetaldehyde in aqueous solution in the presence of calcium hydroxide; said solution being essentially free from methanol.

4. The process for the preparation of pentaerythritol comprising the condensation of formaldehyde and acetaldehyde in aqueous solution in the presence of calcium hydroxide; said solution containing not more than 2 parts by weight of $CH_3OH$ to 40 parts by weight of formaldehyde.

5. The process for the preparation of pentaerythritol comprising the condensation of formaldehyde and acetaldehyde in aqueous solution in the presence of calcium hydroxide; said solution being essentially free from methanol, and containing not more than 20% (by weight) of combined aldehyde, not less than 4 molecules of formaldehyde to 1 molecule of acetaldehyde and not more than 5 molecules of formaldehyde to 1 molecule of acetaldehyde.

JOSEPH A. WYLER.